(12) United States Patent
Granados

(10) Patent No.: US 12,404,693 B2
(45) Date of Patent: Sep. 2, 2025

(54) ELECTRIC VEHICLE CAMPING TENT DEVICE

(71) Applicant: Daniel Granados, Miami, FL (US)

(72) Inventor: Daniel Granados, Miami, FL (US)

(*) Notice: Subject to any disclaimer, the term of this patent is extended or adjusted under 35 U.S.C. 154(b) by 212 days.

(21) Appl. No.: 18/341,908

(22) Filed: Jun. 27, 2023

(65) Prior Publication Data

US 2024/0240491 A1    Jul. 18, 2024

Related U.S. Application Data

(60) Provisional application No. 63/439,387, filed on Jan. 17, 2023.

(51) Int. Cl.
| | |
|---|---|
| *E04H 15/12* | (2006.01) |
| *B60H 1/26* | (2006.01) |
| *E04H 15/06* | (2006.01) |
| *E04H 15/14* | (2006.01) |
| *E04H 15/40* | (2006.01) |
| *E04H 15/42* | (2006.01) |
| *E04H 15/52* | (2006.01) |
| *E04H 15/58* | (2006.01) |
| *B60P 3/34* | (2006.01) |
| *B60P 3/38* | (2006.01) |

(52) U.S. Cl.
CPC ............ *E04H 15/12* (2013.01); *B60H 1/267* (2013.01); *E04H 15/14* (2013.01); *E04H 15/40* (2013.01); *E04H 15/405* (2013.01); *E04H 15/425* (2013.01); *E04H 15/52* (2013.01); *E04H 15/58* (2013.01); *B60P 3/34* (2013.01); *B60P 3/341* (2013.01); *B60P 3/38* (2013.01)

(58) Field of Classification Search
CPC . E04H 15/10–16; E04H 15/40; E04H 15/405; E04H 15/425; B60P 3/32; B60P 3/34; B60P 3/341; B60P 3/38
USPC ..................... 135/91–94, 117, 125, 126, 157
See application file for complete search history.

(56) References Cited

U.S. PATENT DOCUMENTS 1,509,881 A * 9/1924 Severin .................... E04H 15/48
                                                        5/57.1
1,741,424 A * 12/1929 Lundstrom ............. E04H 15/06
                                                        135/88.13

(Continued)

FOREIGN PATENT DOCUMENTS

KR         20170033635 A *   3/2017   ......... B60H 1/00849

*Primary Examiner* — Robert Canfield
(74) *Attorney, Agent, or Firm* — Brennan, Manna & Diamond, LLC

(57) ABSTRACT

An electric vehicle camping tent device that is designed to detachably attach to a side window of an electric vehicle for receiving conditioned air from the vehicle, thereby maintaining a cool (or warm) temperature inside the tent device. The tent device comprises a tent housing made of conventional tent device material and includes an electric vehicle connector portion attached to the housing. The connector portion is connected to the housing using a connecting duct that forms a passage for conditioned air from the electric vehicle to the housing. The connector portion is designed as a pop-in window attachment with window sealant positioned on the outer surface of the connector portion. The tent device is collapsible and can be folded for easy transportation inside a vehicle. The housing forms an enclosed space for enabling users to camp inside the tent device.

6 Claims, 7 Drawing Sheets

(56) References Cited

U.S. PATENT DOCUMENTS

| | | | | |
|---|---|---|---|---|
| 1,925,815 A * | 9/1933 | Alexander | ............... | E04H 6/02 |
| | | | | 160/245 |
| 2,066,078 A * | 12/1936 | Schmeiser | ............. | E04H 15/06 |
| | | | | 135/88.13 |
| 2,122,681 A * | 7/1938 | John | ........................ | B60P 3/38 |
| | | | | 135/88.13 |
| 2,168,913 A * | 8/1939 | Middleton | ............. | E04H 15/00 |
| | | | | 190/18 R |
| 2,204,432 A * | 6/1940 | Morgadanes | .......... | E04H 15/06 |
| | | | | 160/370.21 |
| 2,825,351 A * | 3/1958 | Thornton | ............... | E04H 15/06 |
| | | | | 135/904 |
| 2,865,386 A * | 12/1958 | Burns | .................... | E04H 15/64 |
| | | | | D21/834 |
| 2,962,951 A * | 12/1960 | Holmes | ............... | B60H 1/00257 |
| | | | | 237/28 |
| 3,095,231 A * | 6/1963 | Reed | ...................... | E04H 15/06 |
| | | | | 135/117 |
| 3,356,098 A * | 12/1967 | Krutzikowsky | ........ | E04H 15/04 |
| | | | | 135/117 |
| 3,360,954 A * | 1/1968 | Snider | ............... | B60H 1/00257 |
| | | | | 62/331 |
| 3,547,136 A * | 12/1970 | Koenig | .................. | E04H 15/00 |
| | | | | 135/117 |
| 3,848,279 A * | 11/1974 | Ipsen, Jr. | ............... | A47C 17/70 |
| | | | | 135/117 |
| 3,925,943 A * | 12/1975 | Petrie | ........................ | E04C 3/46 |
| | | | | 135/117 |
| 4,077,418 A * | 3/1978 | Cohen | .................... | E04H 15/48 |
| | | | | 135/95 |
| 4,719,935 A * | 1/1988 | Gustafson | ............... | E04H 15/30 |
| | | | | 5/413 R |
| 4,867,502 A * | 9/1989 | Sylvester | ............... | B60P 3/341 |
| | | | | 296/26.11 |
| 5,335,960 A * | 8/1994 | Benignu, Jr. | .......... | B60P 3/341 |
| | | | | 296/100.18 |
| 5,606,986 A * | 3/1997 | Muise | .................... | E04H 15/54 |
| | | | | 135/117 |
| 5,738,130 A * | 4/1998 | Thomas | .................. | E04H 15/06 |
| | | | | 135/88.13 |
| 5,908,043 A * | 6/1999 | Paes | ........................ | E04B 1/92 |
| | | | | 135/117 |
| 6,070,925 A * | 6/2000 | Moldofsky | ............. | E04H 15/06 |
| | | | | 135/88.13 |
| 6,179,367 B1 * | 1/2001 | Bowen | .................... | E04H 15/20 |
| | | | | 135/124 |
| 6,267,129 B1 * | 7/2001 | Zheng | .................... | E04H 15/40 |
| | | | | 135/126 |
| 6,491,051 B2 * | 12/2002 | Pierce | .................... | E04H 15/12 |
| | | | | 135/92 |
| 6,763,841 B1 * | 7/2004 | Cantwell | ............... | E04H 15/14 |
| | | | | 135/117 |
| 7,472,715 B2 * | 1/2009 | Zheng | .................... | E04H 15/58 |
| | | | | 135/144 |
| 7,703,416 B2 * | 4/2010 | Farmer | .................. | E04H 15/48 |
| | | | | 119/474 |
| 7,921,863 B2 * | 4/2011 | Ways | ...................... | E04H 15/34 |
| | | | | 135/125 |
| 7,997,004 B1 * | 8/2011 | Adrian | ...................... | F24D 5/04 |
| | | | | 126/109 |
| 10,594,906 B1 * | 3/2020 | Kreitzer | ................. | E04H 15/58 |
| 10,914,096 B1 * | 2/2021 | Hovagimian-Beck | ...................... |  |
| | | | | E04H 15/42 |
| 2001/0031618 A1 * | 10/2001 | Wilson | ............... | B60H 1/00257 |
| | | | | 454/119 |
| 2004/0159347 A1 * | 8/2004 | Brown | .................... | E04H 15/40 |
| | | | | 135/125 |
| 2005/0092355 A1 * | 5/2005 | Hsu | ........................ | E04H 15/16 |
| | | | | 135/125 |
| 2005/0103370 A1 * | 5/2005 | Napier | .................... | E04H 15/32 |
| | | | | 135/93 |
| 2006/0162755 A1 * | 7/2006 | Platek | .................... | E04H 15/001 |
| | | | | 296/159 |
| 2008/0210283 A1 * | 9/2008 | Hinz | ...................... | E04H 15/32 |
| | | | | 135/117 |
| 2008/0264461 A1 * | 10/2008 | Harris | ................... | E04H 15/32 |
| | | | | 135/120.1 |
| 2009/0038665 A1 * | 2/2009 | Sumner | .................. | E04H 15/32 |
| | | | | 135/117 |
| 2009/0090406 A1 * | 4/2009 | Maximilien | ............ | E04H 15/40 |
| | | | | 135/88.13 |
| 2010/0147345 A1 * | 6/2010 | Zheng | ...................... | A63B 9/00 |
| | | | | 135/143 |
| 2011/0155199 A1 * | 6/2011 | Harper | ................... | E04H 15/32 |
| | | | | 135/117 |
| 2012/0060975 A1 * | 3/2012 | Fielden | .............. | B60H 1/00257 |
| | | | | 141/98 |
| 2015/0027505 A1 * | 1/2015 | Thompson | ............... | E04H 15/10 |
| | | | | 135/92 |
| 2017/0058555 A1 * | 3/2017 | Tejada | ................... | E04H 15/58 |
| 2022/0268050 A1 * | 8/2022 | Yakubov | ............... | E04H 15/324 |
| 2023/0138139 A1 * | 5/2023 | Kang | ........................ | B60P 3/36 |
| | | | | 454/139 |
| 2024/0229497 A1 * | 7/2024 | Xu | ........................ | E04H 15/425 |
| 2024/0286456 A1 * | 8/2024 | Ingold | .................... | B60H 1/267 |

\* cited by examiner

ELECTRIC VEHICLE CAMPING TENT DEVICE

CROSS-REFERENCE TO RELATED APPLICATION

The present application claims priority to, and the benefit of, U.S. Provisional Application No. 63/439,387, which was filed on Jan. 17, 2023 and is incorporated herein by reference in its entirety.

FIELD OF THE INVENTION

The present invention generally relates to the field of camping tent devices. More specifically, the present invention relates to a novel camping tent designed to detachably attach to a side window of an electric vehicle for receiving conditioned air or heat to maintain an optimum temperature inside the tent. The tent has a connector portion to attach to a side window and a connecting duct transfers the cool or warm air inside the housing of the tent. The tent has a door and a plurality of windows for each accessibility, wherein one such window can be placed over the sunroof of an electric vehicle to serve as a conduit. Accordingly, this disclosure makes specific reference thereto the present invention. Nonetheless, it is to be appreciated that aspects of the present invention are also equally applicable to other like applications, devices, and methods of manufacture.

BACKGROUND

By way of background, camping is popular among people as it offers both physical and mental advantages. Camping provides an opportunity to disconnect from the digital world and is a great way to get some fresh air and exercise. Further, camping is a great way to spend quality time with friends and family, strengthening relationships, and letting people enjoy themselves. Tents are a popular choice for camping and outdoor enthusiasts as they are generally versatile, affordable, portable, and provide campers with a direct connection to the outdoors, enabling them to experience the natural environment.

However, conventional camping tents can get hot and stuffy, particularly during the summer months. Conditioned air is required to keep the tents cool but access to an external supply of cool or warm air when camping is not always accessible. This can be particularly problematic when the camping location is in an area where the temperature is consistently high (or low) or the humidity is high. People desire an improved tent that can be conditioned air or heated easily.

Some people like to go camping in or with their vehicles. However, traditional vehicles cannot provide conditioned air (or heat) for long periods of time due to power issues and conventional tents are not compatible with vehicles, so individuals who prefer tent camping may still face the challenge of staying cool or staying warm.

One potential solution to this problem is to use electric vehicles. Electric vehicles can run for several days if only the conditioned air or heater of the vehicle is being used, which makes them an excellent source of cool (or warm) air for campers. However, currently tents are not compatible for use with electric vehicles and cannot receive conditioned air from the electric vehicle. People desire improved camping tents that can be temporarily attached to an electric vehicle to receive cool or warm air. It is to be appreciated that conditioned air encompasses both cooling and heating of the air.

Therefore, there exists a long felt need in the art for an improved camping tent for campers and outdoor enthusiasts. There is also a long felt need in the art for a camping tent that can detachably attach to a window of an electric vehicle to receive cool or warm air from the vehicle. Additionally, there is a long felt need in the art for a camping tent that provides an optimum temperature for campers even during high or low temperatures. Moreover, there is a long felt need in the art for an improved camping tent that does not require an external electric supply for conditioned air inside the tent. Further, there is a long felt need in the art for a camping tent that allows people to camp with their electric vehicle. Finally, there is a long felt need in the art for an electric vehicle tent device that detachably and securely attaches to an electric vehicle when the tent is in an installed position for receiving conditioned air from the electric vehicle.

The subject matter disclosed and claimed herein, in one embodiment thereof, comprises an electric vehicle camping tent device. The tent device is designed to detachably connect to a side window of an electric vehicle to receive conditioned air from the vehicle without any external supply. The tent device features a tent housing for enabling people to camp inside the tent device, the housing having a front wall, a rear wall, a pair of side walls, and a top surface. A connector portion is integrally attached to the rear wall of the housing through a connecting duct, the connector portion is designed to fit into a window of the electric vehicle wherein the conditioned air from the window of the electric vehicle is transmitted into the housing via the connecting duct for maintaining a lower or higher temperature inside the tent device.

In this manner, the electric vehicle camping tent device of the present invention accomplishes all of the forgoing objectives and provides users with an improved camping tent for campers and outdoor enthusiasts. The tent detachably attaches to a window of an electric vehicle to receive cool or warm air from the vehicle and provides an optimum temperature for campers even during high or low temperatures. Due to compatibility with an electric vehicle, the camping tent does not require an external electric supply for conditioned air inside the tent.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an electric vehicle camping tent device. The tent device is designed to be used with an electric vehicle to receive conditioned air from the vehicle. The tent device further comprising a housing formed of a front wall, a rear wall, a pair of side walls, and a top surface, a connector portion integrally attached to the housing through a connecting duct, the connector portion is designed to fit into a window of the electric vehicle wherein the conditioned air from the window of the electric vehicle is transmitted into the housing via the connecting duct, a large door window pivotally disposed in the front surface with the door pivotally moveable along the hinged edge, the tent device is collapsible and made from a weatherproof and, tear and wear resistant fabric material.

In yet another embodiment, the housing has a height of at least five feet with the width of the rear wall and the front wall ranging from five feet to fifteen feet.

In a further embodiment, the top surface has a generally rectangular large star gazing window along the length thereof and a protective hook and loop fastened window cover panel configured to cover the star gazing window for protection from weather elements.

In a further embodiment, the housing further includes sturdy and flexible poles forming the housing and the housing and the connector portion form a unitary structure, and a plurality of rubber dipped panels are positioned on the housing for secure placement and installation of the tent device.

In a further embodiment of the present invention, the device is made from a bottom transparent layer made of a clear material, a middle mesh netting layer designed to keep insects out and allow air to circulate, and a tent layer made of a durable, water-resistant material that provides shelter and protection from the elements.

In a further embodiment of the present invention, the connector portion is adaptable to fit various sizes and shapes of electric vehicle windows due to its flexibility and can easily seal using a window sealant positioned on the outer surface of the connector portion.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
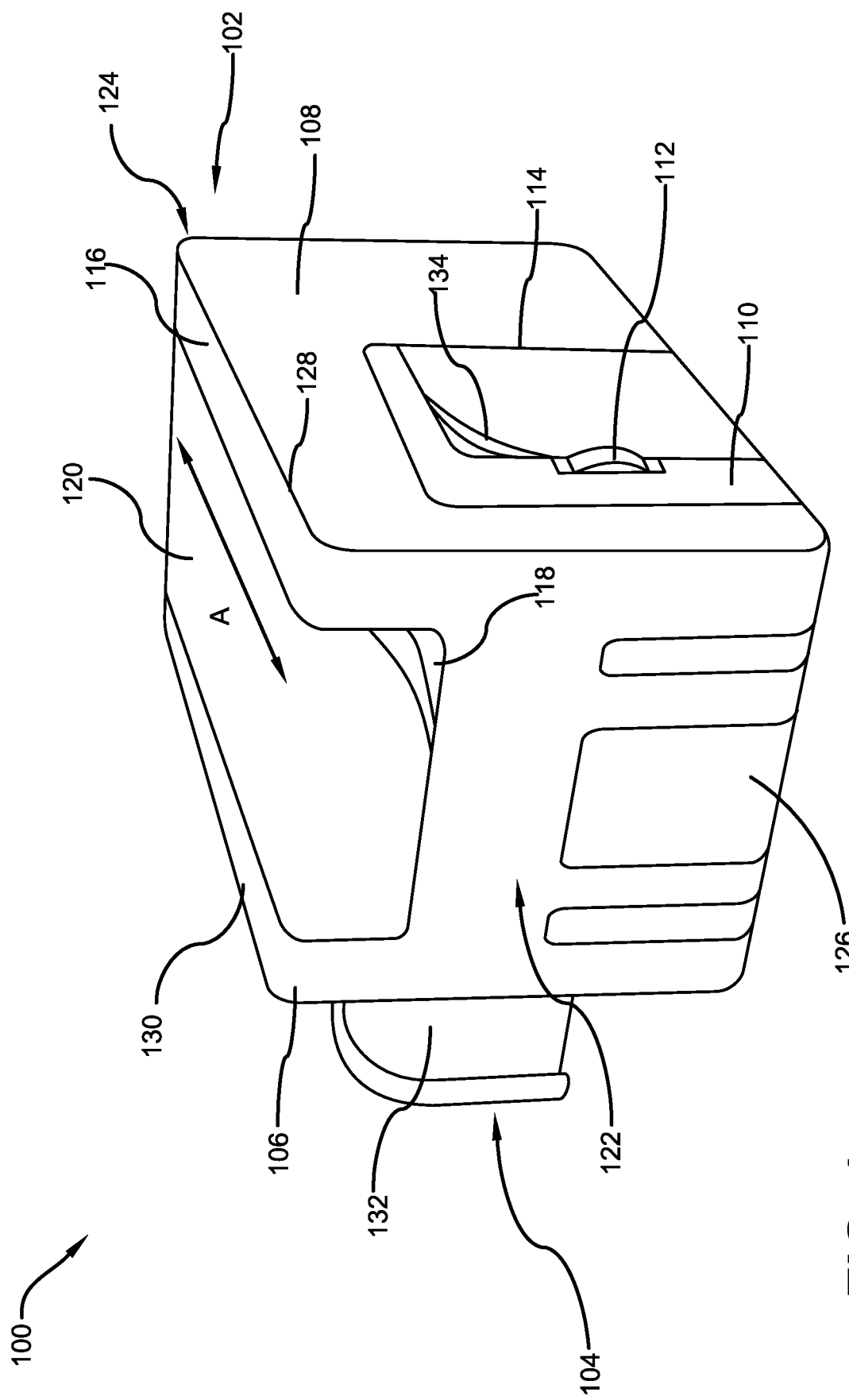
FIG. 1 illustrates a perspective view of one potential embodiment of an electric vehicle camping tent device of the present invention in an upright orientation accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an improved camping tent for campers and outdoor enthusiasts. There is also a long felt need in the art for a camping tent that can detachably attach to a window of an electric vehicle to receive cool or warm air from the vehicle. Additionally, there is a long felt need in the art for a camping tent that provides an optimum temperature for campers even during high or low temperatures. Moreover, there is a long felt need in the art for an improved camping tent that does not require an external electric supply for conditioned air inside the tent. Further, there is a long felt need in the art for a camping tent that allows people to camp with their electric vehicle. Finally, there is a long felt need in the art for an electric vehicle tent device that detachably and securely attaches to an electric vehicle when the tent is in an installed position for receiving conditioned air from the electric vehicle.

The present invention, in one exemplary embodiment, is a electric vehicle camping tent device made of conventional tent device material. The tent device includes an electric vehicle connector portion attached to a tent housing. The tent housing has a large door window pivotally disposed in a front surface of the housing with the door pivotally moveable along the hinged edge, the housing forms an enclosed space for enabling a user to camp inside the tent device and the connector portion extends from the housing using an integrated connecting duct to form a passage for conditioned air from the electric vehicle to the housing, the connector portion being adapted to securely connect to a window of the electric vehicle without requiring an external power supply, and the tent device being collapsible and made from a weatherproof and tear and wear resistant fabric material.

Referring initially to the drawings, FIG. 1 illustrates a perspective view of one potential embodiment of electric vehicle camping tent device of the present invention in an upright orientation accordance with the disclosed architecture. The electric vehicle camping tent device 100 of the present invention is designed to detachably attach to window of an electric vehicle for receiving conditioned air from the electric vehicle, thereby maintaining a cool or warm temperature inside the tent device 100. More specifically, the tent device 100 includes a tent housing 102 made of conventional tent device material and includes an electric vehicle connector portion 104 attached to the housing 102. The housing 102 is generally cuboid and includes a rear wall 106 to which the connector portion 104 is attached thereto. A front wall 108 of the housing 102 has a large door window 110 having a handle 112 for enabling a user to enter into the tent device 100. The large door window 110 is pivotally disposed in the front surface 108 with the door 110 pivotally moveable along the hinged edge 114.

Figure 2:
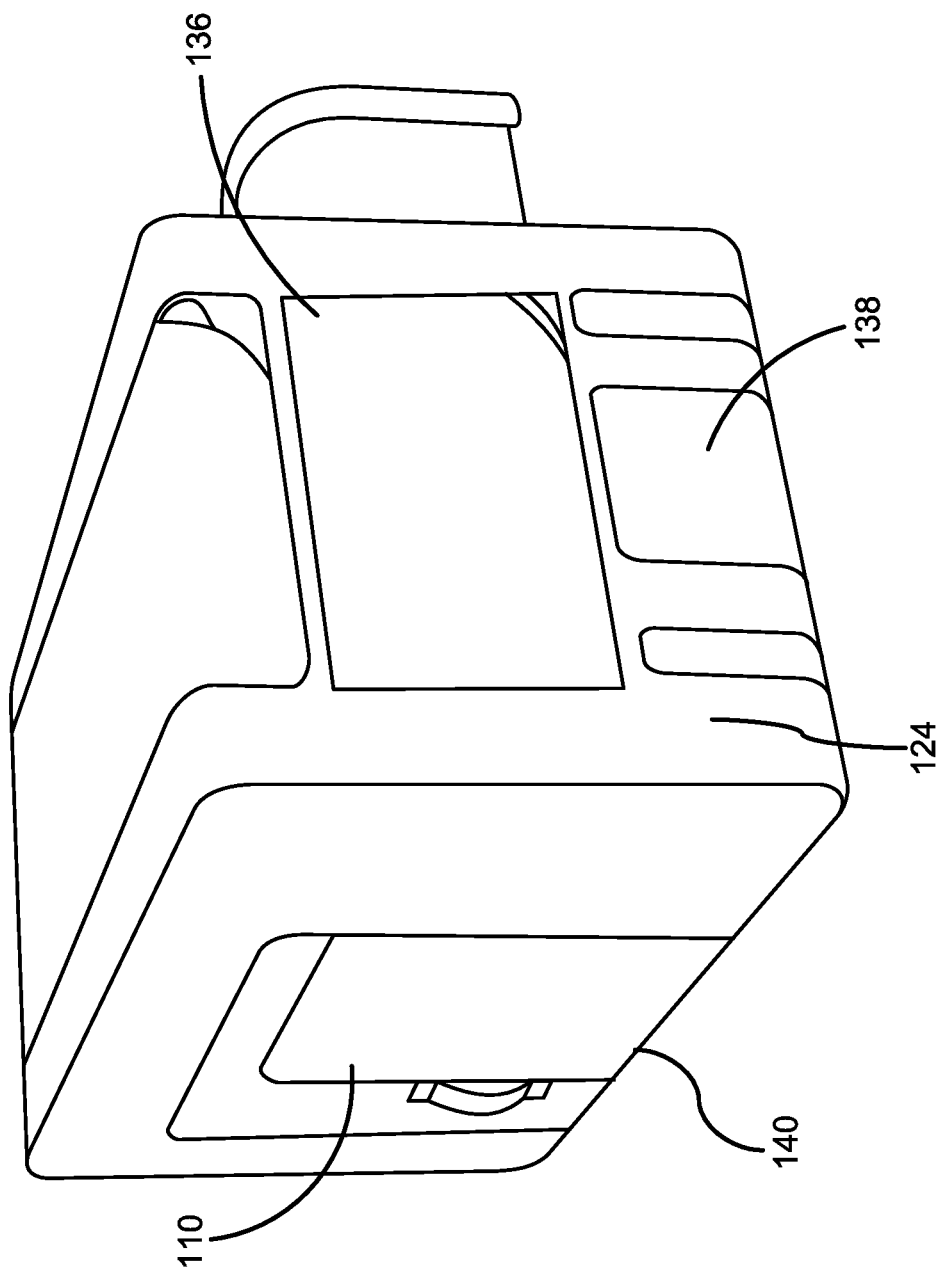
FIG. 2 illustrates another perspective view of the electric vehicle camping tent device of the present invention in accordance with the disclosed architecture.

Top surface 116 of the housing 102 has a generally rectangular large star gazing window 118 along the length of the housing 102 (Arrow A in FIG. 1). The star gazing window 118 has a protective hook and loop fastened window cover panel 120 configured to cover the star gazing window 118 for protection from weather elements. The hook and loop fastened window cover panel 120 extends across a portion of the opposite side walls 122, 124 as illustrated in FIGS. 1 and 2. The first side surface 122 has a plurality of rubber dipped panels 126 for extra grip for secure placement and installation of the tent device 100. Similar cover panel 134 can also be used for covering the large door window 110. A second similar window 118 may be placed over the sunroof of an electric vehicle to serve as a conduit therebetween.

Figure 3:
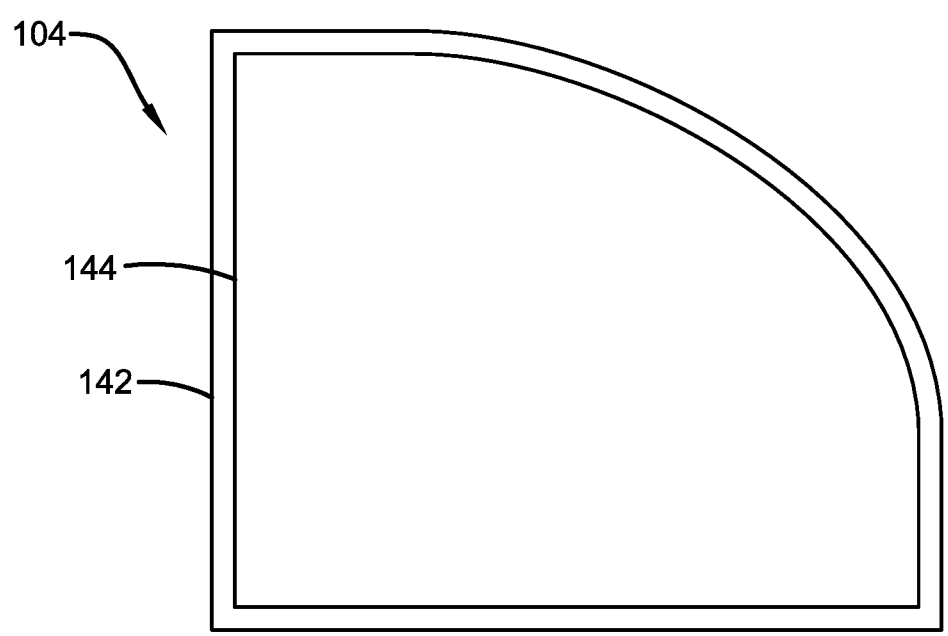
FIG. 3 illustrates a front view of the connector portion of the electric vehicle tent device of the present invention used for connecting to a window of an electric vehicle in accordance with the disclosed architecture.
Figure 4:
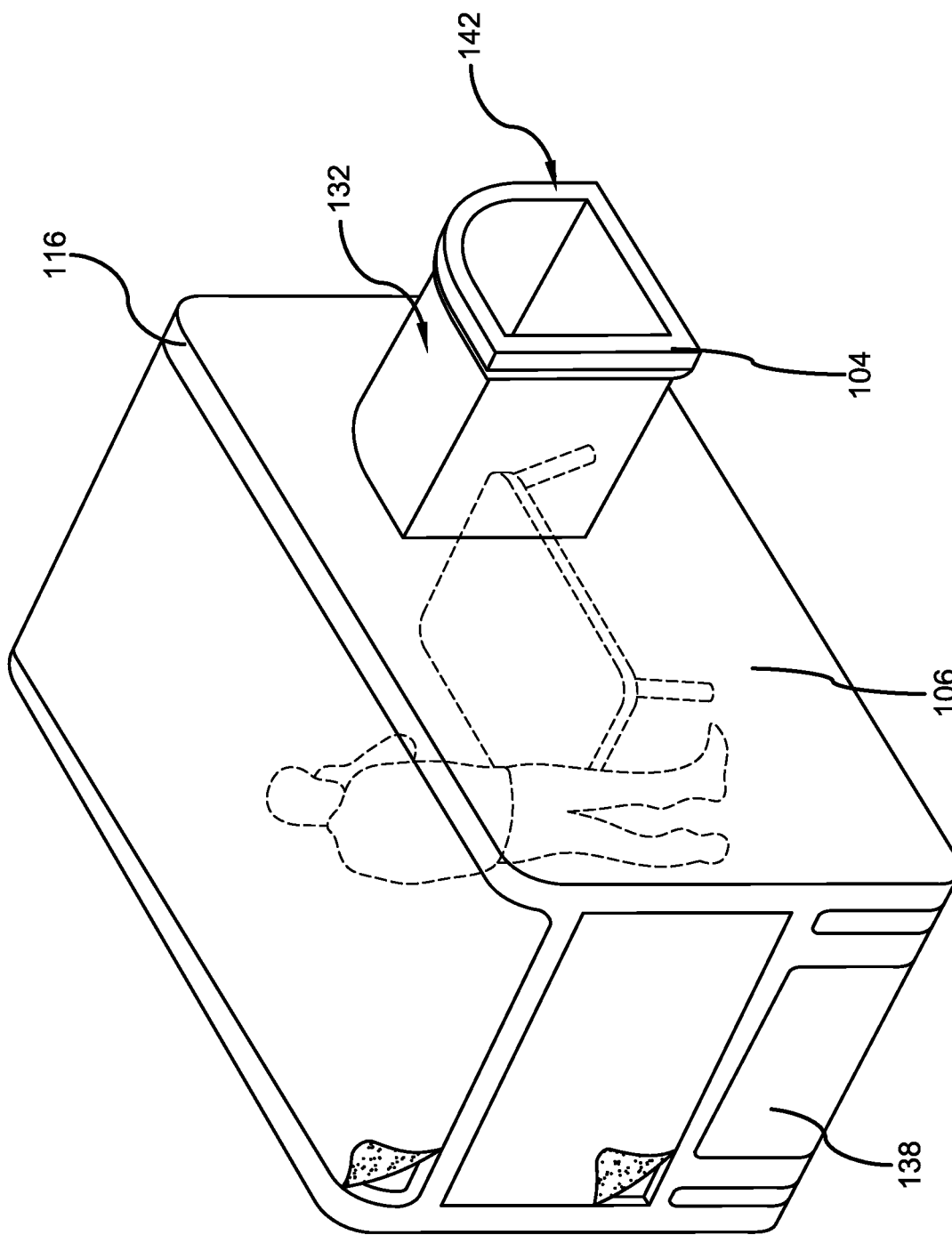
FIG. 4 illustrates a perspective view of the tent device showing the rear wall with the connected connecting portion in accordance with the disclosed architecture.

The housing 102 forms an enclosed space formed by the walls 106, 108, 116, 122, 124 for enabling users to camp inside the tent device 100. The tent housing 102 has a height of at least five feet with the width of the rear wall 106 and the front wall 108 ranges from five (5) feet to fifteen (15) feet to meet requirements of different users. The tent device 100 remains upright upon installation and includes sturdy and flexible poles 128, 130 forming the housing 102. The housing 102 and the connector 104 form a one-piece or unitary structure and the connector portion 104 extends from the housing 102 using an integrated connecting duct 132 to form a passage for conditioned air from the electric vehicle to the housing 102 as illustrated in FIGS. 3 and 4. The connecting portion 104 is adapted to securely connect to a window of the electric vehicle thereby enabling transfer of the conditioned air without any loss and requiring external power supply.

The tent device 100 is collapsible and can be folded for easy transportation inside a vehicle. Further, the tent device 100 can be made from a weatherproof and tear and wear resistant fabric material such as nylon, polyester, laminates, canvas, and the like.

FIG. 2 illustrates another perspective view of the electric vehicle camping tent device of the present invention in accordance with the disclosed architecture. An opposing side surface 124 includes a large side window 136 disposed therein. The window 136 can have a transparent plastic sheet for enabling users to view outside from the tent device 100. The side surface 124 also includes rubber dipped panels 138 for extra grip and stability to the tent device 100. The tent device 100 can have a bottom surface in some of the embodiments and alternatively can be without any bottom surface. The large window door 110 extends from the bottom edge 140 of the front wall 108 and includes a height of at least 80% of the height of the front wall 108. The large side window 136 includes an area of at least 60% of the area of the side surface 124 thereby enabling users inside the tent to be aware of the surroundings outside of the tent.

FIG. 3 illustrates a front view of the connector portion 104 of the electric vehicle tent device of the present invention used for connecting to a window of an electric vehicle in accordance with the disclosed architecture. The connector portion 104 is designed as a pop-in window attachment and includes window sealant 144 positioned on the outer surface 142 of the connector portion 104. The connector portion 104 is slightly bigger in dimension than the window of an electric vehicle such that the connector portion 104 easily pops-in inside the window of the vehicle. The connector portion 104 includes the continuous duct 132 for enabling the conditioned air to pass directly to the tent housing 102. The tent connector portion 104 is flexible and can attain different shapes to meet different window sizes and shapes of electric vehicles.

FIG. 4 illustrates a perspective view of the tent device showing the rear wall with the connected connecting portion in accordance with the disclosed architecture. The rear wall 106 includes the attached connector portion 104 connected via the elongated connecting duct 132. The connecting duct 132 forms the conduit for carrying the conditioned air from an attached electric vehicle to the tent housing 102.

The connector portion 104 and duct 132 are collapsible and can be folded towards the rear wall 106 for storage purposes. Further, the outer surface 142 of the connector portion 104 is sealed to a window of a vehicle for effective transfer of the conditioned air.

Figure 5:
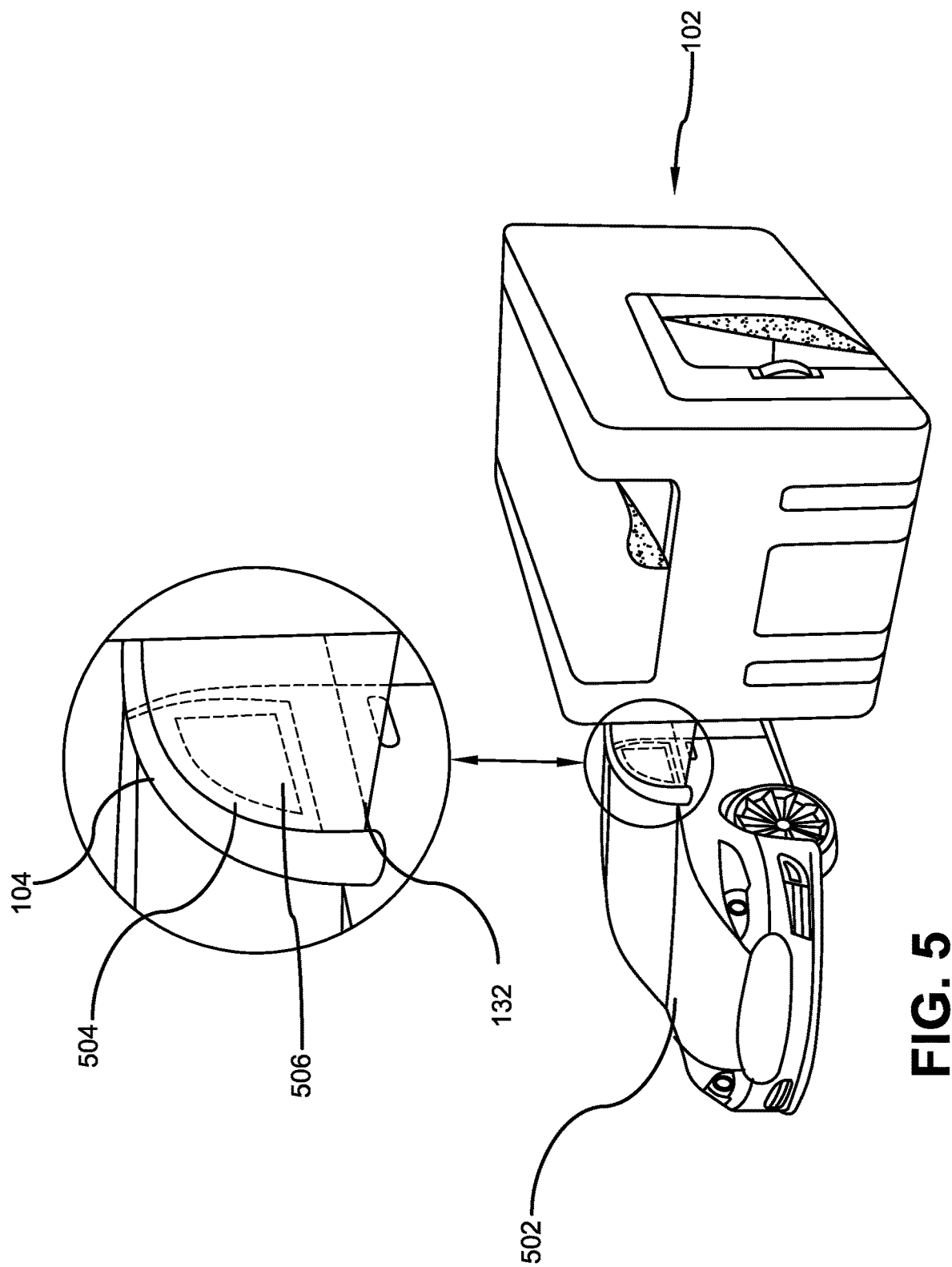
FIG. 5 illustrates a perspective view showing the electric vehicle tent device detachably attached to a window of an electric vehicle in accordance with the disclosed architecture.

FIG. 5 illustrates a perspective view showing the electric vehicle tent device detachably attached to a window of an electric vehicle in accordance with the disclosed architecture. As illustrated, for use with the electric vehicle 502, the tent device 100 is deployed and the connector portion 104 is sewn or sealed to the boundary 504 of a window 506 of the vehicle 502. The window 506 is in an open position enabling the conditioned air to be transferred from the window 506 to the housing 102 via the elongated duct 132. A user can access the tent 100 through the large door window 110 while the connection of the connector portion 104 and the vehicle window 506 remains sealed.

Figure 6:
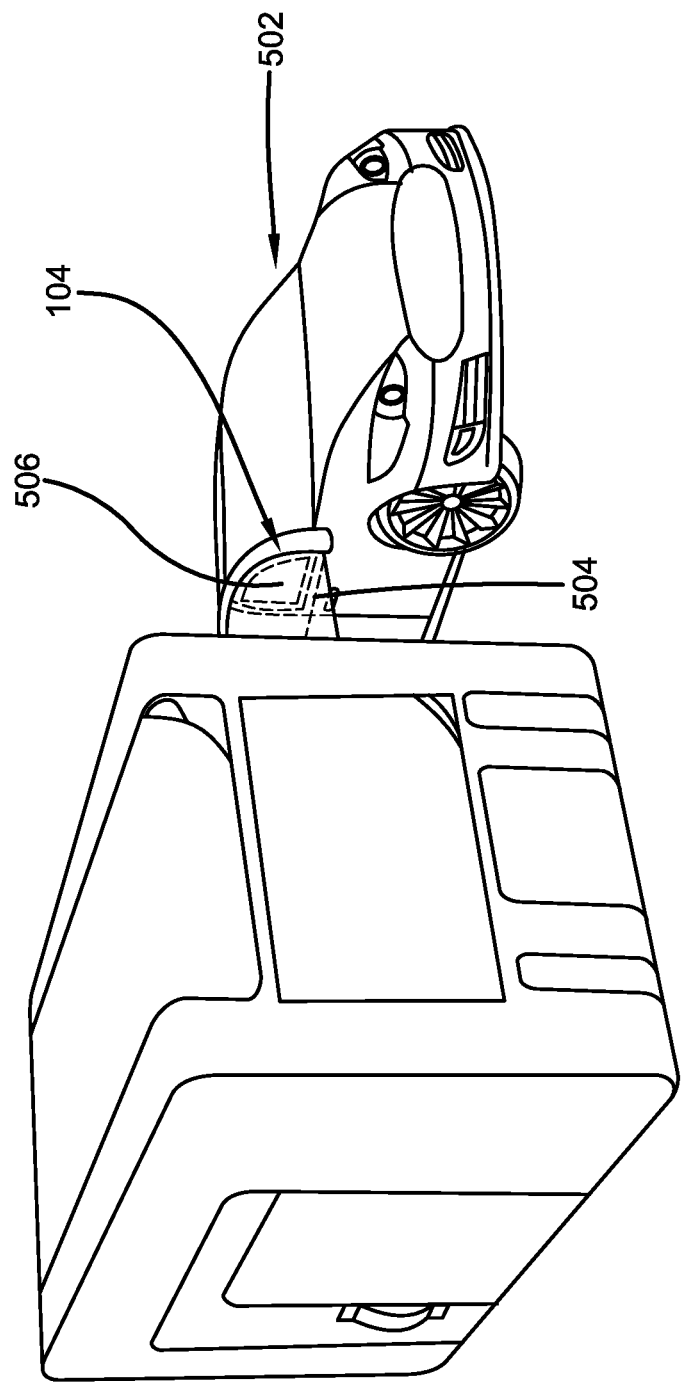
FIG. 6 illustrates another perspective view showing the electric vehicle tent device detachably attached to a window of an electric vehicle in accordance with the disclosed architecture.

Referring to FIG. 6, another perspective view showing the tent 100 being used with the electric vehicle 502 is shown. In some embodiments, the tent device 100 can have one or more connector portions 104 for attaching the tent 100 to more than one electric vehicle.

Figure 7:
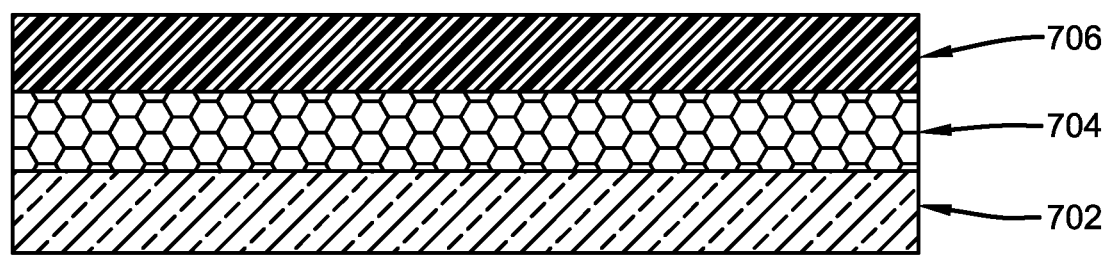
FIG. 7 illustrates a cross sectional view showing different layers used for forming the tent device in accordance with the disclosed architecture.

FIG. 7 illustrates a cross sectional view showing different layers used for forming the tent device 100 in accordance with the disclosed architecture. The tent device 100 is durable, weatherproof and includes a bottom transparent layer 702. The transparent layer 702 is commonly made of a clear material, such as vinyl or PVC, which allows natural light to enter the tent during the day. This layer may also provide some insulation against the cold or wind, depending on the thickness of the material.

A middle mesh netting layer 704 is a breathable fabric that is designed to keep insects out of the tent while enabling air to circulate. This layer allows for ventilation and prevents condensation from building up inside the tent. The tent layer 706 is the outer layer of the tent 100 and provides the primary shelter and protection from the elements. This layer is typically made of a durable, water-resistant material such as nylon or polyester. The tent layer may also have additional features such as reinforced seams, and waterproof coatings.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "electric vehicle camping tent device", "camping tent device", "tent device", and "tent" are interchangeable and refer to the electric vehicle camping tent device 100 of the present invention.

Notwithstanding the forgoing, the electric vehicle camping tent device 100 of the present invention can be of any suitable size and configuration as is known in the art without affecting the overall concept of the invention, provided that it accomplishes the above stated objectives. One of ordinary skill in the art will appreciate that the electric vehicle camping tent device 100 as shown in the FIGS. are for illustrative purposes only, and that many other sizes and shapes of the electric vehicle camping tent device 100 are well within the scope of the present disclosure. Although the dimensions of the electric vehicle camping tent device 100 are important design parameters for user convenience, the electric vehicle camping tent device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An electric vehicle camping tent device comprising:
    a tent housing having an electric vehicle connector portion attached to said tent housing, wherein said tent housing having a generally cuboidal shape including a rear wall to which said connector portion is attached thereto;
    a front wall of said tent housing having a door including a handle, wherein said door is pivotally disposed in said front wall;
    a top surface having a window extending along a length of said tent housing, wherein said window having a hook and loop fastened cover panel, and further wherein said tent housing forms an enclosed space formed by said rear wall, said front wall, a pair of opposing side walls, and said top surface; and
    a plurality of flexible poles for supporting said rear wall, said front wall, and said pair of opposing side walls, wherein said tent housing and said connector portion forming a unitary structure, and further wherein said connector portion having a connecting duct extending from said rear wall to a window opening of the electric vehicle to form a passage for conditioned air to pass therethrough;
    wherein said connecting duct is connected to said window opening of the electric vehicle;
    wherein the hook and loop fastened cover panel extends across a portion of the pair of opposing sidewalls of the tent housing;
    wherein said tent housing having a height of at least five feet;
    wherein said tent housing having a width ranging from five feet to fifteen feet; and
    wherein at least a portion of one of said side walls and at least a portion of a bottom wall having a plurality of rubber dipped panels for grip and stability.

2. The electric vehicle camping device of claim 1, wherein said tent housing is collapsible and foldable.

3. The electric vehicle camping device of claim 2, wherein said tent housing having a material consisting of a weatherproof and a tear resistant fabric, and further wherein said material is selected from a group consisting of a nylon, a polyester, a laminate, and a canvas.

4. An electric vehicle camping tent device comprising:
    a tent housing having an electric vehicle connector portion attached to said tent housing, wherein said tent housing having a generally rectilinear shape including a rear wall to which said connector portion is attached thereto;
    a front wall of said tent housing having a door including a handle, wherein said door is pivotally disposed in said front wall;
    a top surface having a window extending along a length of said tent housing;
    a plurality of flexible poles for supporting said rear wall, said front wall, and said pair of opposing side walls;
    wherein said window having a hook and loop fastened cover panel;
    wherein said tent housing forms an enclosed space formed by said rear wall, said front wall, a pair of opposing side walls, said top surface, and a bottom surface;
    wherein said connector portion having a connecting duct extending from said rear wall to a window opening of the electric vehicle to form a passage for conditioned air to pass therethrough;
    wherein said tent housing and said connector forming a unitary structure;
    wherein said connecting duct is connected to said window opening of the electric vehicle;
    wherein the hook and loop fastened cover panel extends across a portion of the pair of opposing sidewalls of the tent housing;
    wherein said tent housing having a height of at least five feet;
    wherein said tent housing having a width ranging from five feet to fifteen feet; and
    wherein at least a portion of one of said side walls and at least a portion of a bottom wall having a plurality of rubber dipped panels for grip and stability.

5. The electric vehicle camping device of claim 4, wherein said tent housing is collapsible and foldable.

6. The electric vehicle camping device of claim 5, wherein said tent housing having a material consisting of a weatherproof and a tear resistant fabric, and further wherein said material is selected from a group consisting of a nylon, a polyester, a laminate, and a canvas.

* * * * *